(No Model.)
F. M. SPARROW.
ELECTRIC ARC LAMP.
No. 315,564. Patented Apr. 14, 1885.
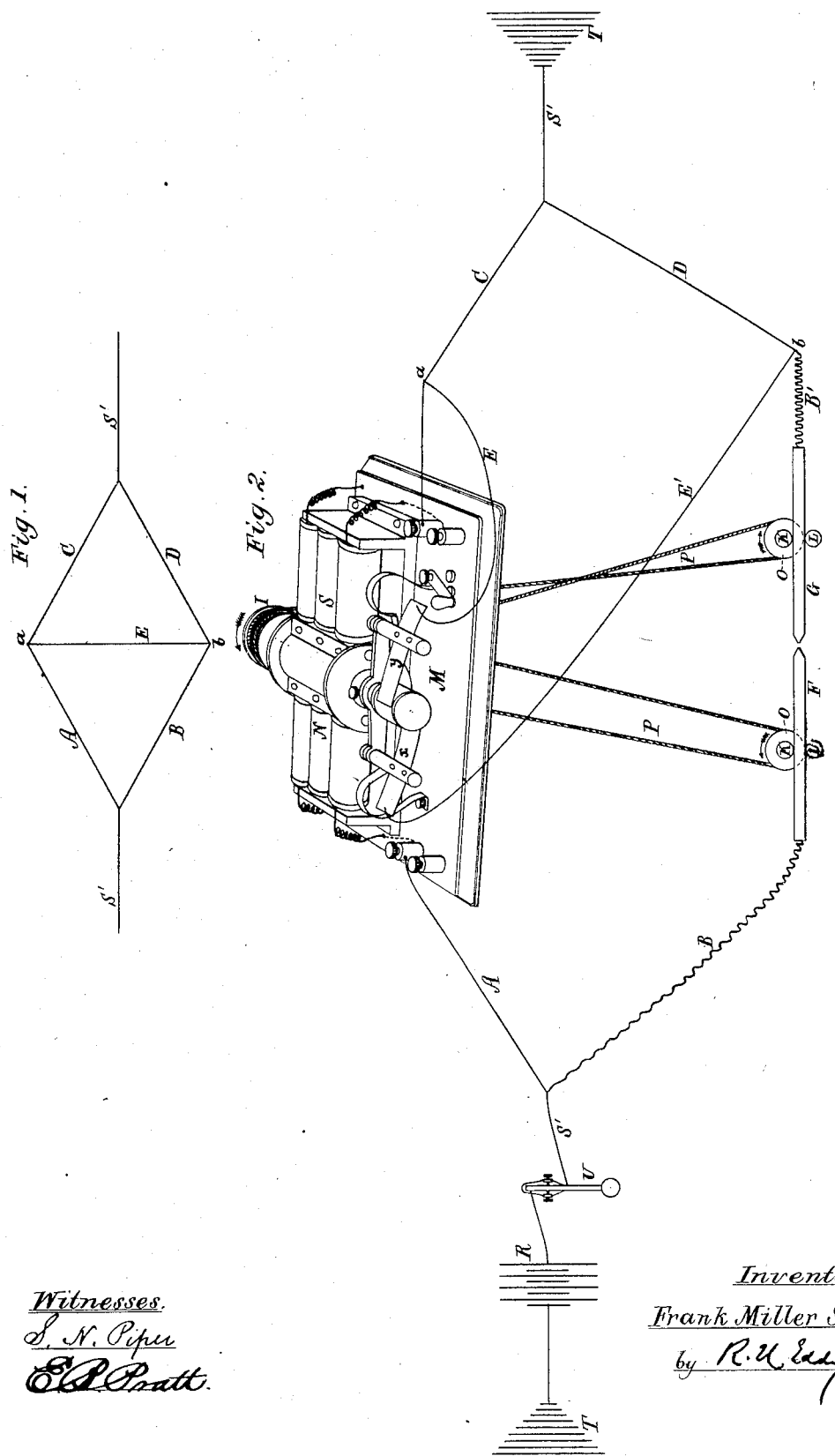
Witnesses.
S. N. Piper
E. P. Pratt
Inventor
Frank Miller Sparrow
by R. H. Eddy atty.

UNITED STATES PATENT OFFICE.

FRANK MILLER SPARROW, OF MATTAPOISETT, MASSACHUSETTS.

ELECTRIC-ARC LAMP.

SPECIFICATION forming part of Letters Patent No. 315,564, dated April 14, 1885.

Application filed March 20, 1884. (No model.)

*To all whom it may concern:*

Be it known that I, FRANK MILLER SPARROW, of Mattapoisett, in the county of Plymouth, in the Commonwealth of Massachusetts, have invented a new and useful Apparatus or Mechanism for Regulating the Distance from one Another of the Carbon Electrodes of an Electric Lamp while in Operation; and I do hereby declare the same to be described in the following specification and represented in the accompanying drawings, of which—

Figure 1 is a diagram illustrative of what electricians term a "Wheatstone bridge," which becomes in my invention an important element. Fig. 2 is a plan of my said invention, which consists in the combination of an electric motor, two carbons or carbon electrodes, and a Wheatstone bridge, and certain mechanism arranged and adapted substantially in manner and to operate, as hereinafter described, with and by an electric or galvanic circuit.

What is termed a "Wheatstone bridge," though well understood by most, if not all, electricians, may be thus described:

Fig. 1 represents a lozenge composed of four wires, A, B, C, and D, connected at two of its opposite angles, $a$ and $b$, by a wire, E. The law or principle of this device, or "bridge," as termed, is that when the electric resistances of the wires A, B, C, and D are such that if the resistance of the wire A is to that of the wire C as that of the wire B is to that of the wire D no current of electricity in going through the lozenge will pass through the cross-wire E; but should the proportions of the resistance be changed by that, for example, of the wire A becoming larger than it should be to satisfy the proportion, the current will flow from $b$ to $a$ through the wire E, and when the resistance of the wire A becomes too small to satisfy the proportion the current will pass through the wire E from $a$ to $b$. Thus it is apparent that if the resistances of the wires B, C, and D be fixed and the resistance of the wire A be variable, a current may be caused to flow between $a$ and $b$ in one direction when the resistance of A is diminished, and in the opposite direction when it is increased.

In carrying out my invention for regulating the carbon electrodes of an electric lamp, I employ this bridge or utilize it in manner as represented in Fig. 2, and as hereinafter described. In such Fig. 2 an electric motor of some proper kind is shown at M as arranged within or applied to one wire, A, of the bridge, (whose other wires are shown at B, B', C, and D;) and having the springs of its pole-changer connected by wires E E' with the lozenge-angles $a$ and $b$.

The two carbons or carbon electrodes of the electric light are shown at F and G as connected by wires B and B' with the wires A and D. One or each of the said carbons is to be so connected with the rotary armature of the motor by suitable mechanism as to be movable thereby toward its fellow when the armature is revolved in one direction, and movable from such fellow when the armature is revolved the opposite way. To effect this movement there may be a pulley, I, on the arbor of the rotary armature of the motor, and to one or each of the electrodes F G there may be a pair of feed-rollers, K L, each upper roller, K, having on its arbor a pulley, O. An endless band, P, may be arranged about each pulley O, and also about the pulley I, one of such bands being what is termed a "crossed band." If one only of the carbons be provided with feed-rollers, a pulley, and band, and the other carbon be held at rest, the effect will be the same, except that as the carbons burn away their points will be moving in one direction and varying the position of the light; but when each of the carbons is movable and provided, as described, with means of moving it toward the other, these points, as they burn down, mutually approach each other, and consequently the light given out remains in one place or position.

In Fig. 2 the circuit-battery is shown at R, the circuit-wire at S', and the ground-wires at T T, there being to the circuit a key, U.

The electric current passing into the motor makes the magnet-pole marked N a positive or plus pole, and going out makes the pole marked S a negative or minus pole. From the pole S the current travels to the point $a$. The current will also, by the wire B, go to and through the carbon electrodes F and G and the wire B'' to the point $b$, and thence through the wires C and D and out at their junction. From this it will be seen that the circuit-wires between the wires S' S' constitute substantially a Wheatstone bridge. The motor M affords one resistance and the carbon electrodes F G another, the wires C and D constituting other resistances. The wires E and E' go from the points $a$ and $b$ to the pole-changer springs $x$ $y$ of the motor, in which case the current will be carried to the rotary armature of the motor. When the current goes from the point $a$ to the point $b$, it will go through the wire of the armature in a direction to make one pole of it a plus and the other a minus pole; but when the current goes in the opposite direction—that is, from the point $b$ to the point $a$—the plus pole becomes changed to a minus one and the minus pole to a plus one. The current going through the magnet of the motor always in the same direction, the poles of the magnet have a stable polarity or do not change; but as the poles of the armature do change their polarity the armature will revolve in one direction for a current from $a$ to $b$, and in the opposite direction for a current from $b$ to $a$. From this it will be seen, the armature being connected to either or each of the carbon electrodes by a suitable mechanism for moving one apart from the other, or both apart from each other, the approaching movement will be effected when the armature may be revolved in one direction, and the receding movement will take place when the armature may be revolved in the opposite way. The resistance of the carbon electrodes varies according to their distances asunder. Therefore, if, in accordance with the principle of the Wheatstone bridge, the wire of the magnet of the motor has a resistance of thirty ohms, and the resistance of the wire C be five ohms and that of the wire D one ohm, the resistance of the carbons must be six ohms. Under these circumstances the carbons are to be supposed to afford a steady light when they are at a determined or fixed distance apart, in which case the electric current will have no effect to produce rotary motion of the armature of the magnet; but should the carbons burn away so as to increase their distance apart the resistance of the carbon branch will be increased and the current will flow from $a$ to $b$, and as a consequence will cause the armature of the motor to revolve in a direction by which a movement of one or each carbon toward the other will be produced until their normal distance apart be reached. So, in case of the said carbons being nearer together than the said normal distance, the direction of the current will be reversed, or it will flow from $b$ to $a$, and will set in motion the armature in a way to cause the mechanism to move the carbons apart, or one apart from the other, until their normal distance asunder may be reached. Thus with my invention it will be seen that as the carbons may burn away their distance asunder will be kept uniform, or practically so, great steadiness of the light being thereby produced. If the normal distance between the carbons is required to be increased to increase their resistance and the light given off by them, the proportions of the resistances are to be changed. For example, if the magnet-wire have a resistance of forty ohms and the wire C have a resistance of five ohms, and that of the wire D be one ohm, the resistance of the carbons and their wires should be eight ohms.

I make no claim to the combination of an electric lamp placed in a main circuit with sets of resistance-coils placed in a branch circuit, and with electro regulating appliances placed in a metallic connection or Wheatstone bridge between the main and branch circuits, as represented in the United States Patent No. 243,196; nor do I claim the combination of an electric lamp placed in a main circuit and sets of resistance-coils placed in a branch circuit, with a metallic connection or Wheatstone bridge between the main and branch circuits, and with electro-magnets and regulating mechanisms arranged within the bridge, all being as represented in such Patent No. 243,196, for in carrying out my invention I have no sets of resistance-coils nor mechanism for regulating the movement of the carbons by gravity. I have positive mechanism for operating the carbons, the regulating agent being a motor, as described.

I would further remark that I do not claim, broadly, the application of a Wheatstone bridge in an electro-magnetic circuit in connection with mechanism to regulate the descent of a carbon electrode when caused by the action of gravity on it and its holder.

I claim—

The combination of the two carbon electrodes with a Wheatstone bridge, an electric circuit, and an electric motor adapted thereto, and provided with mechanism applied to it and to one or each of such electrodes, and suitably constructed to effect, by means of the motor as the carbons may be consumed, a positive movement of one or each of them toward the other, in order to maintain them practically at a uniform distance apart, as and for the purpose described.

FRANK MILLER SPARROW.

Witnesses:
R. H. EDDY,
E. B. PRATT.